Jan. 7, 1964

A. E. NEUMANN 3,116,680

ROASTING MACHINE

Original Filed Sept. 24, 1959

INVENTOR.
Arthur E. Neumann
BY
Bacon & Thomas
ATTORNEYS

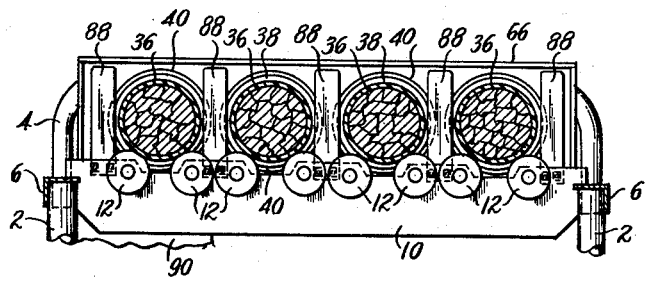
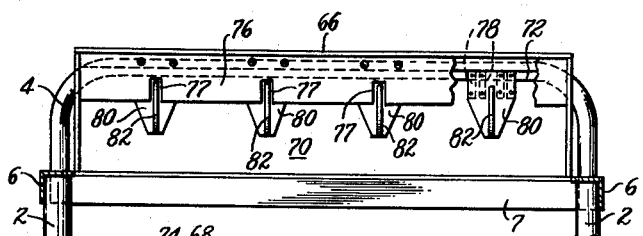
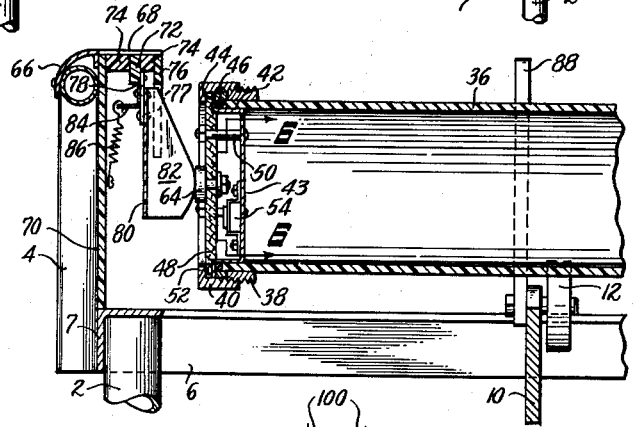
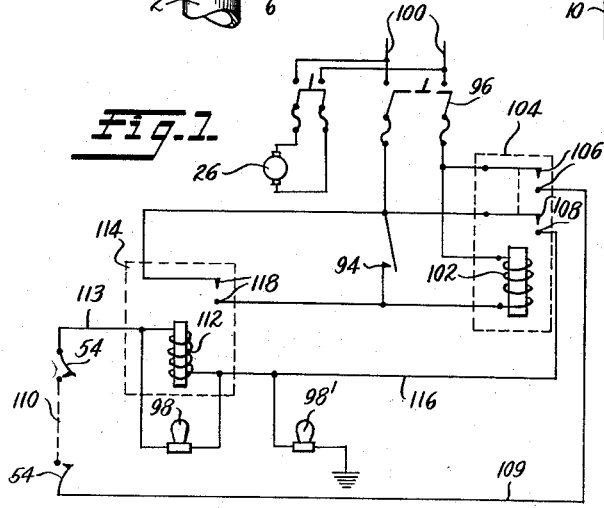
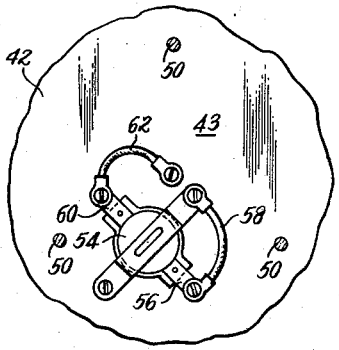
INVENTOR.
Arthur E. Neumann
BY
Bacon & Thomas
ATTORNEYS

United States Patent Office 3,116,680
Patented Jan. 7, 1964

3,116,680
ROASTING MACHINE
Arthur E. Neumann, 980 Greenwood Ave., Winnetka, Ill.
Original application Sept. 24, 1959, Ser. No. 842,124, now Patent No. 3,009,813. Divided and this application Apr. 15, 1960, Ser. No. 27,465
9 Claims. (Cl. 99—358)

This invention relates to apparatus for roasting foods, and particularly for roasting meat, by passing an electric current therethrough to heat the meat by virtue of its electrical resistance.

This application is a division of my application Serial No. 842,124, filed September 24, 1959, now Patent No. 3,009,813.

Whenever meats are cooked with the usual known methods, gravity tends to pull the juices down to the bottom, leaving the upper sections of the meat drier than the lower sections. With encased meats, where moisture is intended to be retained within the case, the part of the meat from which gravity has removed the juices, tends to flake apart and become very dry. If this prepared combination of chunks of meat is rotated during the heating process, so that the juices are constantly moved throughout the entire volume, the end result is a more uniform prepared volume of meat. Also, the gelatins and juices therein bond the chunks of meat together in a solid mass.

The apparatus of the invention comprises a generally cylindrical open-ended container of electrical insulating material in which chunks of meat or other foods are to be firmly packed. End caps are provided for closing and sealing the ends of the container and which end caps provide further for conduction of electric current to the ends of the body of meat packed in the container. The closed sealed container packed with meat is placed on a specially designed support having electrical terminals frictionally engaging the end caps of the container to complete an electrical circuit therethrough. The support further includes means for rotatably supporting the container about a horizontal axis substantially in line with the points of contact between the end caps and the electrical terminals. Motor-driven means are provided for slowly rotating the container as current passes through the food and results in uniform heating and cooking of the food throughout its volume. The slow rotation of the container about its horizontal axis results in uniform distribution of the fluids and juices therein so that they do not settle to one side. When meat in particular is being cooked, the attainment of the final cooking temperature results in automatic opening of the electric circuit. Preferably the container is rotated while the cooked meat is cooling so as to maintain the juices therein distributed uniformly throughout the mass. When the cooked meat product has completely cooled, the gelatinous material in the juices congeals and binds the entire mass of meat into a single solid body which may then be removed from the container and frozen or sliced and immediately eaten.

It is therefore an object of this invention to provide a roasting machine including a sealable container and means for supporting the same for rotation about a horizontal axis while slowly rotating the same and passing an electric current through a food product therein.

Other objects and advantages will become apparent to those skilled in the art as the description proceeds with reference to the accompanying drawings, wherein:

FIG. 3 is a transverse sectional view taken substantially along the line 3—3 of FIG. 1;

FIG. 4 is a transverse sectional view taken substantially along the line 4—4 of FIG. 1;

FIG. 5 is an enlarged fragmentary vertical sectional view taken along the line 5—5 of FIG. 2;

FIG. 6 is a further enlarged fragmentary sectional view taken substantially along the line 6—6 of FIG. 5; and FIG. 7 is a schematic wiring diagram showing a manner in which the circuits involved in the present invention may be arranged.

Figure 2:
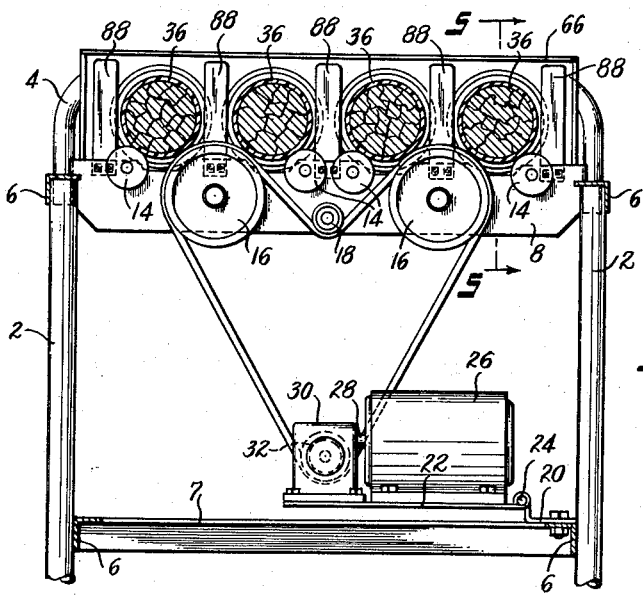
FIG. 2 is a transverse sectional view of the machine of FIG. 1 taken substantially along the line 2—2 of FIG. 1.

The machine of the present invention comprises a frame having upstanding end frame members 2 joined at their upper ends by a transverse inverted U-shaped frame member 4. Longitudinal frame elements 6 and transverse frame elements 7, in the form of angle irons, extend horizontally between the end frame members 2. Intermediate the ends of the upper frame members 6 is a pair of transverse plates 8 and 10, suitably joined to the upper frame member 6 by welding or the like so as to be secured in a substantially vertical plane. The plate member 10 is provided with four pairs of laterally spaced rollers 12 journalled thereon on horizontal axes in position so that their upper peripheries extend above the upper edge of plate 10. The transverse plate 8 is provided with four small rollers 14 arranged in axial alignment with corresponding rollers on plate 10 and likewise journalled on the plate 8 so that their peripheries extend above the upper edge of plate 8. Preferably the rollers 12 and 14 are of rubber or at least provided with rubber or the like peripheral portions. The plate 8 is further provided with a pair of large pulleys 16 journalled thereon and a small idler pulley 18, as shown in FIG. 2. The large pulleys 16 are so dimensioned and arranged that their upper peripheries cooperate with adjacent small rollers 14 in a manner to be described.

One of the lower longitudinal frame members 6 constitutes a support for a motor bracket 20 bolted thereto. The motor bracket 20 includes a motor support plate 22 pivoted on a horizontal axis at 24 and having a motor 26 mounted thereon. The output shaft 28 of the motor drives a reducing gear assembly 30 having an output pulley 32. An endless belt 34 is trained under the output pulley 32, over large pulleys 16 on plate 8 and under the idler pulley 18, all as clearly shown in FIG. 2. The grooves in pulleys 16 are so related to the thickness of belt 34 that the latter projects radially outwardly from the periphery of those pulleys, as shown in FIG. 2. As will be obvious, the weight of the motor 26, being offset from the pivot 24, will effect the maintenance of constant uniform tension on belt 34.

A plurality of food containers in the form of open-ended hollow cylinders 36 are provided (see FIG. 5). Each cylinder 36 is formed of electrical insulating material impervious to the action of the food to be contained therein and of high heat-resisting characteristics. Each end of each tube 36 is provided with a threaded ring 38 to which a clamping ring 40 is removably threaded. An end closure is provided for each end of each tube 36 and each closure comprises a metal cup-shaped member 42 adapted to fit snugly within the end of the tube 36. Each cup 42 is provided with a bottom wall 43 and an outer flange 44 overlying the end of tube 36 and engaging an O-ring seal 46 whereby the ends of the tubes 36 may be effectively sealed. A cover plate 48 of electrical insulating material overlies the open side of each cup 42 and is secured permanently thereto by means of rivets, bolts or the like 50. Thus, the clamping rings 40 may be screwed onto the threaded rings 38 and the flanges 52 of the rings 40 effectively clamp the end closures in the described relationship in the ends of tubes 36 to close and seal the same.

On the inner face of the bottom wall 43 of each cup member 42 a thermally-responsive switch 54 is mounted (see also FIG. 6). The details of the switch 54 are not shown but it is to be understood that these switches may be of conventional form whereby they are normally closed to complete a circuit therethrough but will open to interrupt the circuit when they are heated to a predetermined temperature. Each of the switches 54 is electrically connected from one of its terminals 56 and through a conductor 58 to the metal plate 43 constituting the bottom wall of the cup 42. The other terminal 60 of each switch 54 is connected through a conductor 62 to a central conductive button or terminal 64 mounted on and extending through the center of insulating plate 48 substantially at the axis of the tube 36.

It is to be understood that, as shown, the end closure structure just described is duplicated at each end of each of the tubes 36 but that, if desired, one end of each tube may be provided with a permanent non-removable closure.

Each of the upper frame members 4 supports a bracket 66 extending across the machine and comprising an upper metal portion 68 and an insulating plate member 70. A transverse insulating bar 72 is supported from a bracket portion 68 as is insulating spacer 74 and a downwardly extending insulating plate or apron 76 provided with spaced downwardly open slots 77 therein.

A plurality of leaf spring pivots 78 (see FIG. 4) are secured at their upper ends to the insulating bar 72 and pivotally support a plurality of contact plates 80, there being a contact plate 80 for each of the tubes 36. Each contact plate 80 is provided with a contact element 82 in the form of a conductive plate arranged at right angles to the plate 80, extending outwardly through a slot 77 and being rounded at its inner edge with its crest lying substantially along the axis of an associated tube 36. An outwardly extending bracket 84 is fixed to each plate 80 and a tension spring 86 extends from each bracket 84 to insulating plate 70. Thus, it will be seen that the springs 86 tend to swing the contact elements 82 inwardly and toward the tubes 36 about the pivot defined by flexible leaf springs 78. When the tubes 36 and their end closures are in the position shown in FIG. 5 the contact elements 82 engage buttons 64 to complete a circuit from metal cups 42 through switches 54 and buttons 64 to conductors 109 and 113 (FIG. 7) in the electrical circuit. It is to be understood that the spring-urged contact structure just described is reproduced at each end of the machine.

The rollers 12, 14 and 16, previously described, are so positioned that the tubes 36 may be placed thereon to be supported by axially aligned pairs of said rollers, in the manner shown in FIGS. 2 and 3, with the tubes also in frictional contact with the outer periphery of the belt 34 where it is trained over pulleys 16. As will be obvious, operation of motor 26 results in rotation of each of the tubes 36 about its horizontal axis. Such rotation takes place with the buttons 64 in constant conductive contact with the edges of conductor plates 82.

The transverse frame plates 8 and 10 are further provided with upstanding guides or spacers 88 fixed thereto to extend upwardly between adjacent tubes 36. The parts are so dimensioned that there is a slight clearance between each tube 36 and its adjacent guides 88. The guides 88 prevent inadvertent lateral displacement of the tubes 36 while the machine is in operation and further assist in guiding the tubes into proper position on rollers 12 and 14 when the machine is being prepared for operation.

As shown in the drawings, the upper portion of the inner edge of each contact element 82 slopes upwardly and outwardly and thus serves as a cam surface to force the contact plates 82 outwardly to the proper position when the filled tubes 36 are being placed on the machine.

Figure 1:
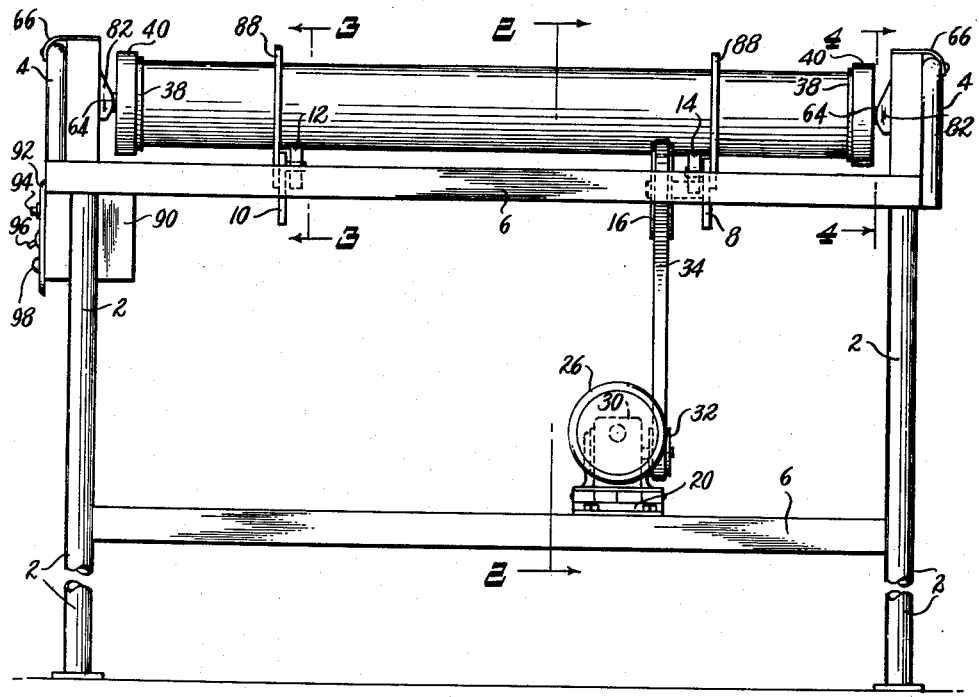
FIG. 1 is a side elevational view of a machine embodying the principles of the present invention.

FIG. 1 further shows the machine as including a suitable control box 90 provided with a control panel 92 having thereon, by way of example, a starting switch button 94, a main Off-On switch 96 and one or more signal lights 98.

In operation, one of the end closures for each tube is removed therefrom and the tube is filled and packed tightly with the food to be cooked, for example, chunks of meat with suitable seasoning. When filled and firmly packed, the end closure is replaced and clamped in place to seal the meat in the tube 36 and hold the same therein. The filled tubes are then placed on the machine described and the machine is started. In starting the machine the motor 26 is energized and a circuit is completed through the conductors 109 and 113 to feed electrical current through the meat product. Passage of current through the meat results in heating the same and cooking the meat uniformly throughout its mass. Because of the large area of the bottom wall 43 of cup 42, sufficient surface is provided at the ends of the meat roll to allow good conduction of electric current through the entire meat section without electrolysis. As soon as the entire body of meat has reached final cooked temperature, one or both of the thermal switches 54 on each tube becomes heated to that same temperature (at which it is set to open) and interrupts the circuit through the food. The cooked meat is then permitted to cool to room temperature, preferably while being rotated, and the juices and galatinous materials therein congeal to bind the entire mass into a solid food product. The continuous rotation of the tubes 36, which may be as slow as 1 r.p.m., prevents gravitation of the juices to one side of the mass and effects their uniform distribution throughout. While the speed of rotation of the tubes 36 may vary within a wide range, it obviously must not be so high that juices are thrown to the outer periphery of the mass by centrifugal force.

FIG. 7 schematically illustrates a suitable control circuit for use with the apparatus described, there being a complete circuit for each of the tubes 36.

The Off-On switch 96, previously referred to, is shown as a double pole single throw switch adapted to connect the circuits of the apparatus to line conductors 100, preferably of about 220 volts A.C., 60 c.p.s. Motor 26 is on a separate circuit and runs continuously. However, the mere closing of switch 96 does not energize any other part of the circuit. When it is desired to start the cooking cycle, starting switch 94, which may be of the spring-opened pushbutton type, is momentarily closed. Closing of switch 94 energizes the coil 102 of voltage relay 104 and results in closing the pairs of contacts 106 and 108. Closing of contacts 106 and 108 completes a circuit from one side of the line 100 through contacts 106 and conductor 109 to one of the thermal switches 54, through the mass of meat indicated at 110, through the other thermal switch 54 at the other end of the tube 36, then through the coil 112 of current relay 114. Conductor 116 connects the other side of the coil 112 to one of the closed contacts 108, the other of which is connected to the other side of the line. As soon as this circuit is completed by the described closing of contacts 106 and 108, the coil 112 closes contacts 118, constituting part of a holding circuit to maintain the coil 102 energized even though switch 94 may be subsequently opened. Thus, it is only necessary to momentarily close switch 94 to energize the circuits described, including the holding circuit, whereupon switch 94 may be released and the circuit will remain energized to pass current through the meat 110. Current continues to pass through the mass of meat until one or both of the thermal switches 54 opens to break the circuit.

Signal light 98 is connected in shunt across the coil 112 of relay 114. At the start of the cooking cycle the resistance of the cold meat mass is relatively high and a relatively small amount of current flows therethrough. Thus, there is only a small voltage drop across the impedance of coil 112 and signal light 98 glows dimly, if at all. As cooking progresses, however, the resistance of the mass of meat decreases and more current flows therethrough.

With higher current flowing in the circuit the voltage drop across the impedance of coil 112 becomes greater and that voltage drop is applied to signal light 98 to cause the same to glow more brightly as cooking progresses. The bulb 98 may be so chosen that it achieves full brightness at the time the cooking of the meat is complete and thus serves as a visual indicator. A further signal light 98' is connected between conductor 116 and ground to indicate when the cooking circuit is energized. Signal light 98', if lighted, indicates that the cooking cycle is progressing even though signal light 98 may be very dim.

It will be obvious to those skilled in the art that the thermal switches 54 may be omitted and that a watt-hour meter may be employed to open contacts 118. Such a meter would be placed in the circuit carrying the cooking current. It has been found that the total wattage necessary to cook a charge of meat is substantially constant, the time depending only on the way the meat is packed in the tubes and the amount and type of seasoning. For example, 15 pounds of turkey requires about 490 watt-hours to cook to a temperature of 175° F.

While a single specific embodiment of the invention has been shown and described herein, it is to be understood that the same is merely illustrative of the principles of the invention and that other forms may be resorted to within the scope of the appended claims.

I claim:

1. Roasting apparatus comprising; a closed water impervious elongated cylindrical container of electrical insulating material defining a closed chamber adapted to have food packed therein, an access opening in said container and a removable door member sealing said opening, means loosely and removably supporting and rotating said container about a substantially horizontal axis coinciding with the axis of said cylinder, conductive electrodes in opposite sides of said container having spaced food contacting portions therein, and means for conducting electric current to said electrodes whereby food packed in said container is cooked by the passage of electric current therethrough between said electrodes while said container rotates about said axis.

2. Apparatus as defined in claim 1 wherein said electrodes are substantially on said horizontal axis, said last-named means comprising stationary terminals frictionally engaging said electrodes.

3. Apparatus as defined in claim 1 wherein said container comprises an open-ended hollow tube, closures for the open ends of said tube, one of said open ends comprising said access opening and one of said closures being said door member, said electrodes comprising conductive surfaces on the inner faces of said closures, conductive terminals on the outer faces of said closures, and means electrically connecting said terminals to said conductive surfaces, said cylindrical tubing being supported for rotation about its cylindrical axis.

4. Apparatus as defined in claim 1 wherein said supporting and rotating means comprising a plurality of rollers journalled for rotation on parallel horizontal axes, said cylinder resting removably on and frictionally engaging said rollers, and means for drivingly rotating at least one of said rollers to thereby rotate said cylinder.

5. Apparatus as defined in claim 4 wherein said one roller comprises a pulley, said means for rotating said roller comprising a drive belt trained over said pulley, said cylinder resting on said belt for frictional driving engagement therewith.

6. Apparatus as defined in claim 4 wherein said rollers all engage said cylinder adjacent the bottom thereof, and stationary guide means adjacent the sides of said cylinder to prevent inadvertent displacement of said cylinder laterally of said rollers.

7. Apparatus as defined in claim 3 wherein at least one of said closures comprises a structure defining a closed chamber, one wall of said chamber comprising said inner face of said closure, said last-named means including a thermally-responsive switch in said chamber for interrupting current flow above a predetermined elevated temperature.

8. Roasting apparatus comprising; a hollow cylinder of electrical insulating material adapted to have food packed therein, closures for the ends of said cylinder, at least one of said closures being removable, at least the inner faces of said closures being electrically conductive, at least the central portion of the outer faces of said closures comprising conductive terminals, means carried by each closure for conducting electric current from said terminals to said inner faces, a frame having movable means thereon for engaging the periphery of said cylinder and supporting the same in horizontal position and for rotating said cylinder about its longitudinal horizontal axis, and spaced means on said frame for engaging said conductive terminals to conduct electric current thereto.

9. Apparatus as defined in claim 8 including means for resiliently urging said spaced means into firm contact with said conductive terminals.

References Cited in the file of this patent

UNITED STATES PATENTS

| | | |
|---|---|---|
| 267,685 | Fowler | Nov. 21, 1882 |
| 994,714 | Boyle | June 13, 1911 |
| 1,754,574 | Sater | Apr. 15, 1930 |
| 1,803,597 | Graig | May 5, 1931 |
| 2,820,130 | Dadson | Jan. 14, 1958 |
| 2,877,118 | Hensgen et al. | Mar. 10, 1959 |
| 2,906,046 | Graves | Sept. 29, 1959 |
| 2,940,380 | Rampel | June 14, 1960 |

FOREIGN PATENTS

| | | |
|---|---|---|
| 472,024 | Canada | Mar. 6, 1951 |